US00RE42906E

(19) United States
(12) Reissued Patent
Onion

(10) Patent Number: US RE42,906 E
(45) Date of Reissued Patent: Nov. 15, 2011

(54) FOLDING KNIFE WITH SAFETY LOCK

(75) Inventor: Kenneth J. Onion, Kaneohe, HI (US)

(73) Assignee: Kai U.S.A., Ltd., Tualatin, OR (US)

(21) Appl. No.: 11/154,998

(22) Filed: Jun. 15, 2005

Related U.S. Patent Documents

Reissue of:
(64) Patent No.: 6,591,504
Issued: Jul. 15, 2003
Appl. No.: 09/904,194
Filed: Jul. 12, 2001

U.S. Applications:
(63) Continuation-in-part of application No. 29/143,656, filed on Jun. 18, 2001, now Pat. No. Des. 474,669, and a continuation-in-part of application No. 09/750,235, filed on Mar. 5, 2001, now Pat. No. 6,427,334, said application No. 09/904,194 is a continuation-in-part of application No. 09/591,183, filed on Jun. 8, 2000, now Pat. No. 6,378,214, and a continuation-in-part of application No. 09/483,075, filed on Jan. 14, 2000, now Pat. No. 6,338,431.

(60) Provisional application No. 60/173,233, filed on Dec. 28, 1999, provisional application No. 60/138,318, filed on Jun. 9, 1999, provisional application No. 60/130,401, filed on Apr. 19, 1999.

(51) Int. Cl.
*B26B 1/02* (2006.01)

(52) U.S. Cl. ..... 30/160; 30/161

(58) Field of Classification Search ..... 30/331, 30/519, 308.2, 153–161; 7/118–120; 132/26.2; D8/99

See application file for complete search history.

(56) References Cited

U.S. PATENT DOCUMENTS

| | | | | | |
|---|---|---|---|---|---|
| 576,862 | A | * | 2/1897 | Lebold | 30/161 |
| 729,378 | A | * | 5/1903 | Mintzer | 30/161 |
| 821,176 | A | * | 5/1906 | Leland | 30/161 |
| 915,269 | A | * | 3/1909 | Chemienes | 30/160 |
| 946,132 | A | * | 1/1910 | Hull | 30/159 |
| 978,165 | A | * | 12/1910 | Johnson | 30/161 |
| 1,056,404 | A | * | 3/1913 | De Lorenzo | 30/161 |
| 1,189,005 | A | * | 6/1916 | Seely | 30/308.2 |
| 1,231,058 | A | * | 6/1917 | Pansa | 30/161 |
| 1,263,440 | A | * | 4/1918 | Lenardič | 30/161 |
| 1,373,993 | A | * | 4/1921 | Boe | 30/161 |
| 1,415,887 | A | * | 5/1922 | McWilliams | 30/161 |
| 1,428,296 | A | * | 9/1922 | Neft | 30/153 |
| 1,454,665 | A | * | 5/1923 | Bobek | 30/161 |

(Continued)

FOREIGN PATENT DOCUMENTS

DE 1104386 * 4/1961

(Continued)

*Primary Examiner* — Jason Daniel Prone

(74) *Attorney, Agent, or Firm* — Seed IP Law Group PLLC

(57) ABSTRACT

A folding knife having a safety lock moveably mounted on a handle of the knife. The safety lock may slide to a locking position to prevent the blade from opening out of the handle by obstructing the path of the blade as the blade is urged from a closed position to an open position. The safety lock also may slide away from the locking position, in which the safety lock does not obstruct the path of the blade.

2 Claims, 3 Drawing Sheets

U.S. PATENT DOCUMENTS 1,512,689 A * 10/1924 Hermann ..... 30/161
1,515,688 A * 11/1924 Love ..... 30/308.2
1,552,361 A * 9/1925 Trombley ..... 30/161
1,614,949 A * 1/1927 Finley ..... 30/308.2
1,701,771 A * 2/1929 Di Stefano ..... 30/162
1,743,022 A * 1/1930 Carman ..... 30/161
2,193,708 A * 3/1940 Bergkvist et al. ..... 30/161
2,243,030 A * 5/1941 Fischer ..... 30/162
2,304,601 A * 12/1942 Schrade ..... 30/159
2,461,941 A * 2/1949 Sutton ..... 30/161
3,600,835 A * 8/1971 Hendricks ..... 30/159
3,868,774 A * 3/1975 Miori ..... 30/161
4,040,181 A * 8/1977 Johnson ..... 30/161
4,133,106 A * 1/1979 Addis ..... 30/160
4,145,808 A * 3/1979 Walsh ..... 30/161
4,218,819 A * 8/1980 Phelps ..... 30/157
4,240,201 A * 12/1980 Sawby et al. ..... 30/161
4,268,960 A * 5/1981 Reinschreiber ..... 30/161
4,274,200 A * 6/1981 Coder ..... 30/161
4,322,885 A * 4/1982 Osada ..... 30/162
4,351,126 A * 9/1982 Simonson ..... 43/5
4,404,748 A * 9/1983 Wiethoff ..... 30/161
4,451,982 A * 6/1984 Collins ..... 30/161
4,502,221 A * 3/1985 Pittman ..... 30/160
4,670,984 A * 6/1987 Rickard ..... 30/161
4,730,394 A * 3/1988 Sonner, Jr. ..... 30/161
4,805,303 A * 2/1989 Gibbs ..... 30/161
4,811,486 A * 3/1989 Cunningham ..... 30/161
4,837,932 A * 6/1989 Elsener ..... 30/161
4,947,552 A * 8/1990 Barnes ..... 30/161
4,974,323 A * 12/1990 Cassady ..... 30/155
4,979,301 A * 12/1990 Walker ..... 30/161
5,025,557 A * 6/1991 Perreault ..... 30/161
5,044,079 A * 9/1991 Gibbs ..... 30/160
5,060,379 A * 10/1991 Neely ..... 30/161
5,092,045 A * 3/1992 Boyd et al. ..... 30/161
5,095,624 A * 3/1992 Ennis ..... 30/161
5,111,581 A * 5/1992 Collins ..... 30/161
5,293,690 A * 3/1994 Cassady ..... 30/161
5,325,588 A * 7/1994 Rogers ..... 30/161
5,331,741 A * 7/1994 Taylor, Jr. ..... 30/158
5,400,509 A * 3/1995 Collins ..... 30/161
5,425,175 A * 6/1995 Rogers ..... 30/161
5,461,786 A * 10/1995 Miller ..... 30/161
5,493,781 A * 2/1996 Saito ..... 30/162
5,495,674 A * 3/1996 Taylor, Jr. ..... 30/160
5,502,895 A * 4/1996 Lemaire ..... 30/158
5,511,310 A * 4/1996 Sessions et al. ..... 30/161
5,515,610 A * 5/1996 Levin et al. ..... 30/161
5,537,750 A * 7/1996 Seber et al. ..... 30/161
5,689,885 A * 11/1997 Walston ..... 30/160
5,692,304 A * 12/1997 Campbell ..... 30/161
5,722,168 A * 3/1998 Huang ..... 30/161
5,737,841 A * 4/1998 McHenry et al. ..... 30/161
5,755,035 A * 5/1998 Weatherly ..... 30/161
5,781,998 A * 7/1998 Stamper ..... 30/153
5,802,722 A * 9/1998 Maxey et al. ..... 30/160
5,815,927 A * 10/1998 Collins ..... 30/161
5,822,866 A * 10/1998 Pardue ..... 30/161
5,826,340 A * 10/1998 Hull ..... 30/161
5,887,347 A * 3/1999 Gibbs ..... 30/161
5,953,821 A * 9/1999 Mearns ..... 30/161
5,966,816 A * 10/1999 Roberson ..... 30/156
6,122,829 A * 9/2000 McHenry et al. ..... 30/161
6,125,543 A * 10/2000 Jhones ..... 30/161
6,145,202 A * 11/2000 Onion ..... 30/160
6,260,461 B1 * 7/2001 Mok ..... 30/160
6,434,831 B2 * 8/2002 Chen ..... 30/161
6,438,848 B1 * 8/2002 McHenry et al. ..... 30/161
6,591,504 B2 * 7/2003 Onion ..... 30/160
6,675,484 B2 * 1/2004 McHenry et al. ..... 30/161
6,848,184 B2 * 2/2005 Cheng ..... 30/155
7,051,440 B2 * 5/2006 Bremicker et al. ..... 30/161
7,124,510 B2 * 10/2006 Frazer ..... 30/161
7,340,838 B2 * 3/2008 Onion ..... 30/159
7,581,321 B2 * 9/2009 Kain ..... 30/153
RE41,259 E * 4/2010 McHenry et al. ..... 30/161
7,752,759 B2 * 7/2010 Perreault ..... 30/161
7,774,940 B2 * 8/2010 Frank ..... 30/157
7,941,927 B1 * 5/2011 Demko ..... 30/161
2004/0088865 A1 * 5/2004 Onion ..... 30/161
2011/0107603 A1 * 5/2011 Giuntoli et al. ..... 30/161

FOREIGN PATENT DOCUMENTS

FR 1069862 * 7/1954

* cited by examiner

FOLDING KNIFE WITH SAFETY LOCK

Matter enclosed in heavy brackets [ ] appears in the original patent but forms no part of this reissue specification; matter printed in italics indicates the additions made by reissue.

CROSS REFERENCE TO RELATED APPLICATIONS

This application claims priority [to] *from and is a CIP of* U.S. Design Pat. Application Ser. No. 29/143,656, filed Jun. 18, 2001 for a POCKET KNIFE, [and a] *now U.S. Pat. No. Des.474,669. The present application claims priority from and is a* CIP of 09/750,235 filed Mar. 5, 2001 now U.S. Pat. No. 6,427,334, which *claims benefit of Provisional application No. 60/173,233 filed Dec. 28, 1999. The present application claims priority from and* is a CIP of 09/591,183 filed Jun. 8, 2000 now U.S. Pat. No. 6,378,214, which *claims benefit of U.S. Provisional Patent Application Ser. No. 60/138,318, filed Jun. 9, 1999 and also claims priority from and* is a CIP of 09/483,075 filed Jan. 14, 2000 now U.S. Pat. No. 6,338,431, *which claims benefit of Provisional application No. 60/130,401, filed Apr. 19, 1999. The present application claims priority from and is a CIP of 09/483,075 filed Jan. 14, 2000 now U.S. Pat. No. 6,338,431, which claims benefit of Provisional application No. 60/130,401, filed Apr. 19, 1999.*

BACKGROUND OF THE INVENTION

The present invention relates generally to knives, and more particularly to a folding pocket knife with a safety lock to hold a blade of the knife in a closed position. The safety lock is moveably mounted on a handle of the knife, and may slide to a locking position, in which the safety lock prevents the blade from opening out of the handle by obstructing the path of the blade as the blade is urged from a closed position in the handle to an open position out of the handle. The safety lock also may slide away from the locking position, in which the safety lock does not obstruct the path of the blade so that the blade may freely move from the closed position to an open position.

This safety lock is particularly useful in knives having an assisted opening mechanism, such as those disclosed in U.S. Pat. Nos. 5,802,722, 5,815,927, and 6,145,202, the disclosures of which are incorporated herein by reference. An understanding of some prior locking mechanisms for knives also may be obtained from U.S. Pat. Nos. 1,189,005, 1,743,022, 4,133,106, 4,451,982, 4,947,552, 4,974,323, 4,979,301, 5,060,379, 5,092,045, 5,293,690, 5,647,129, and 5,822,866, the disclosures of which are incorporated herein by reference.

The advantages of the present invention will be understood more readily after a consideration of the drawings and the Detailed Description.

DETAILED DESCRIPTION AND BEST MODE OF THE INVENTION

Figure 1:
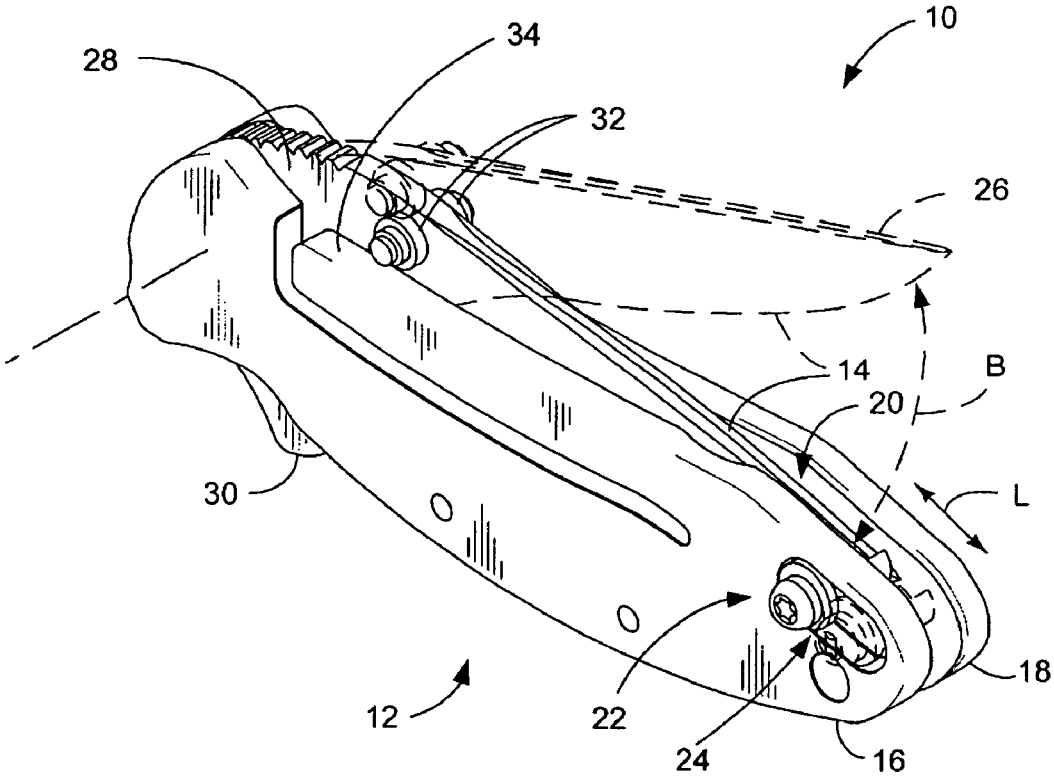
FIG. 1 is an isometric view of a knife according to one embodiment of the present invention, including a blade, a handle, and a safety lock, with the blade shown in solid lines in a closed position and in broken lines in an open position, and with the safety lock shown in solid lines in a locking position and in broken lines in an unlocked position, with arrows demonstrating possible movement of the blade and safety lock.

Referring to the drawings, and more specifically to FIG. 1, a folding knife 10 according to one embodiment of the present invention is shown. Knife 10 includes a handle 12 and a blade 14 pivotally coupled to handle 12, as described in more detail below. Preferably, handle 12 is assembled from a first side piece 16 and a second side piece 18 that define a hollow region 20 for receiving blade 14 when blade 14 is in a closed position relative to handle 12. This closed or folded position is shown in solid lines in FIG. 1.

When blade 14 is in the closed position, a safety lock 22 may slide along a path 24 to a locked position to prevent a distal end 26 of blade 14 from pivoting out of handle 12 to an open position. A solid arrow L shows the preferred movement of safety lock 22. Safety lock 22 may also slide to an unlocked position to allow blade 14 to pivot freely between closed and open positions as indicated by a dashed arrow B.

Blade 14 may further include a tang 28 with a protruding portion 30 located opposite distal end 26, and a thumb stud 32, both elements useful in aiding a user in the opening of knife 10, as described in more detail below. Knife 10 may further include a displaceable lining portion 34 that may lock blade 14 in a fully extended position. This is achieved by a bias that causes lining portion 34 to move into the path of blade 14 once blade 14 has moved to a substantially open position. Closing blade 14 requires moving lining portion 34 out of the path of blade 14. These features are further described in U.S. Pat. Nos. 6,145,202 and 5,802,722.

Figures 2, 3:
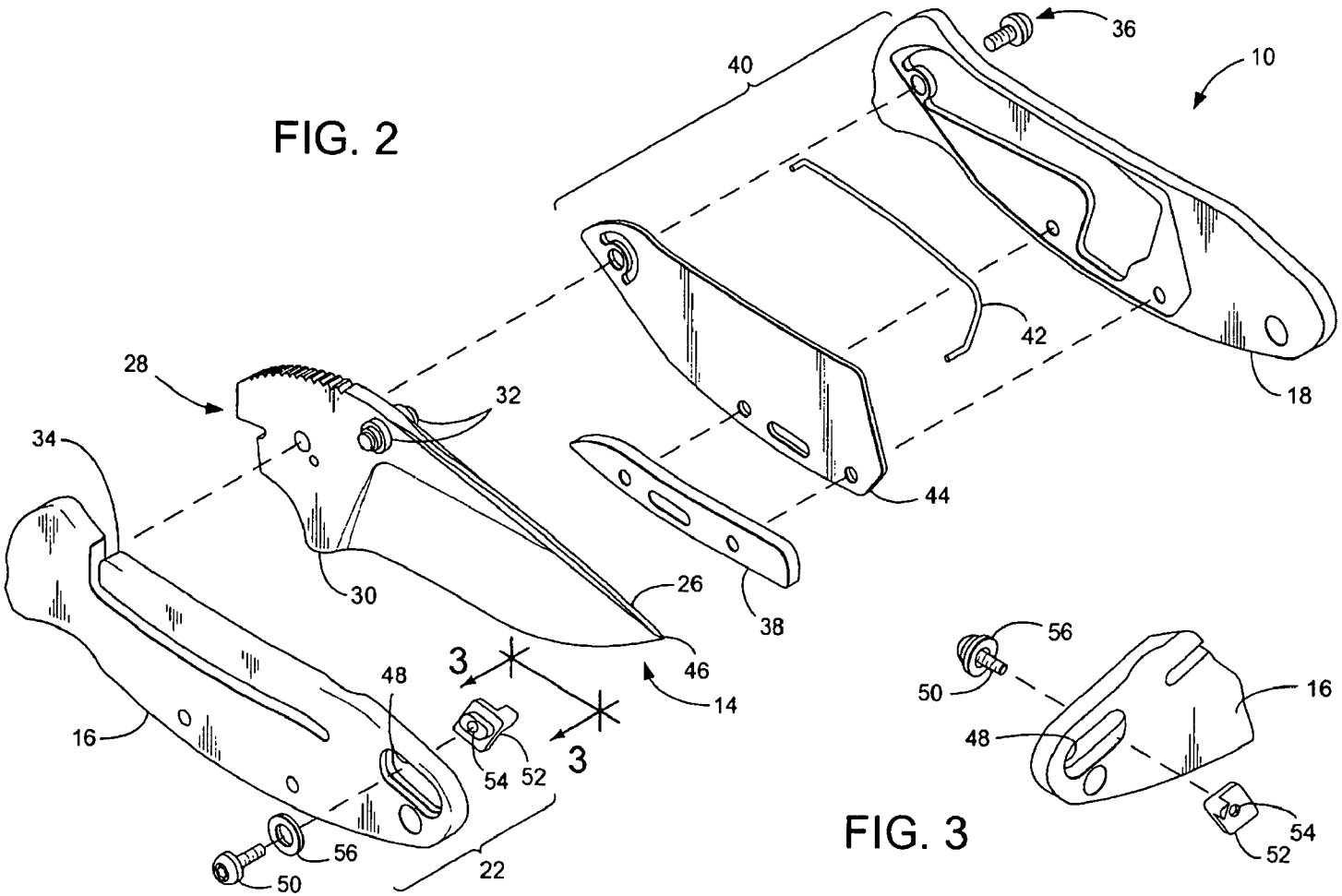
FIG. 2 is an exploded, isometric view of the knife of FIG. 1.
FIG. 3 is an exploded, isometric view of a portion of the knife of FIG. 1 along line 3—3 of FIG. 2.
Figure 4:
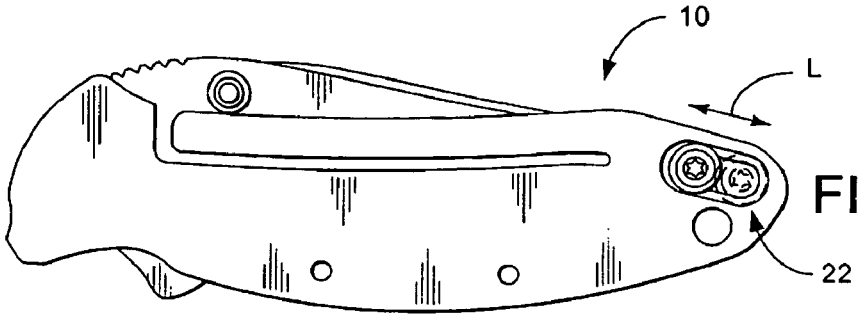
FIG. 4 is a front view of the knife of FIG. 1.
Figure 5:
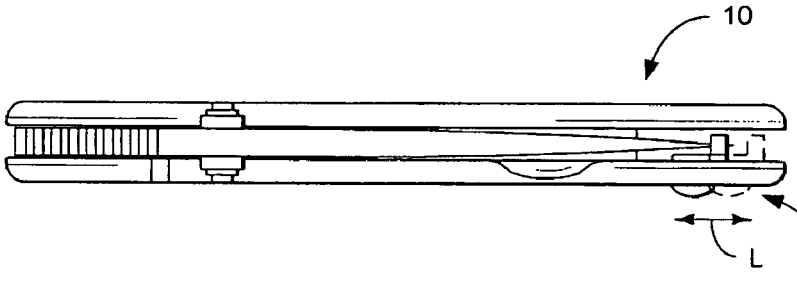
FIG. 5 is a top view of the knife of FIG. 1.
Figure 6:
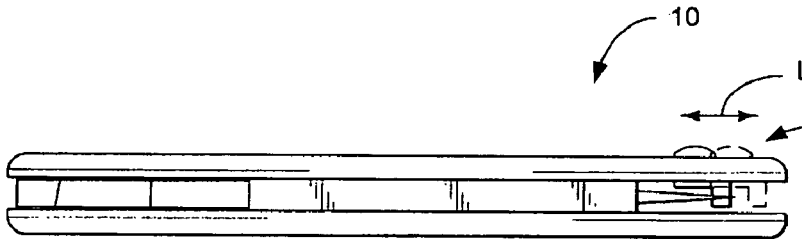
FIG. 6 is a bottom view of the knife of FIG. 1.
Figure 7:
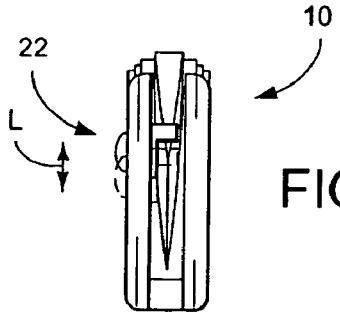
FIG. 7 is an end view of the knife of FIG. 1.

Referring to FIG. 2, the exploded view of knife 10 shows other typical elements of knife 10. Knife 10 includes a pivot pin 36 that allows blade 14 to pivot between open and closed positions and couples side pieces 16 and 18. Knife 10 further includes a spacer 38 that couples side pieces 16 and 18 and together with side pieces 16 and 18, forms hollow region 20 for receiving blade 14, as described above.

Knife 10 may still further include an assisted opening mechanism 40 that aids a user in opening knife 10. Assisted opening mechanism 40 includes a bias element 42 that urges blade 14 toward the fully extended position once blade 14 has been moved a certain distance from the closed position or past an equilibrium point. Assisted opening mechanism 40 further includes an internal plate 44 that, along with spacer 38, restricts the movement of one end of bias element 42. Bias element 42 is configured to transmit forces between blade 14 and handle 12 and is a push rod including hooks on each end, but alternatively may be a plunger, flexible cable, or other suitable force-transmitting element. Assisted opening mechanism 36 is described in detail in U.S. Pat. Nos. 6,145,202 and 5,802,722.

As shown in greater detail in FIG. 2, distal end 26 of blade 14 typically includes a point 46, but may include a blunt end or other tool head. As described above, tang 28 includes a portion 30 configured to protrude from handle 12. This allows a user to open blade 14 from the closed position by pushing protruding portion 30 back into hollow region 20, thereby urging blade 14 past the equilibrium point of assisted opening mechanism 40. Blade 14 also may include a thumb stud 32 located on one or both sides of blade 14, which allows a user to apply a force to stud 32 to extend blade 14. These features are useful in one-handed assisted opening devices and safety lock 22 is particularly useful as a safety precaution with these devices. It will be understood that safety lock 22 may also be used for pocket tools and knives that do not include assisted opening mechanisms.

Referring to FIGS. 2 and 3, safety lock 22 is mounted in a channel or slotted hole 48 located in handle 12. Slotted hole 48 preferably is located near distal end 26 of blade 14. Safety lock 22 is configured to obstruct the path of travel of distal end 26 of blade 14 when preventing blade extension, as described above.

Safety lock 22 preferably includes a bolt 50 configured to attach to a block or latch 52 through slotted hole 48. Block 52 preferably includes a threaded hole 54 to mate with bolt 50. Block 52 typically is constructed of plastic or rubber material to minimize or prevent damage to blade 14 when blade 14 contacts block 52. As long as block 52 of safety lock 22 is obstructing the path of blade 14 or limiting the movement of blade 14, safety lock 22 is operable in preventing the extension of blade 14 and is considered locked.

Safety lock 22 generally is positioned in one of two positions in slotted hole 48 on handle 12. Safety lock 22 is shown in several of the figures in dashed lines in an unlocked or inoperable position, in which the path of blade 14 is unobstructed. Safety lock 22 is shown in all of FIGS. 1–7 in solid lines in a locked or operable position that obstructs the path of blade 14.

The user may adjust safety lock 22 between locked and unlocked positions by sliding bolt 50 along slotted hole 48. Safety lock 22 is held in a user-selected position by friction. The friction may be adjusted by adjusting the tightness of bolt 50. Safety lock 22 may further include a washer 56 between the head of bolt 50 and handle 12 to enhance frictional contact between handle 12 and lock 22.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

[1. A folding knife comprising:

a blade including a distal end and a tang;

a handle configured to include a hollow region for receiving the blade, said blade being pivotally coupled to the handle via a pin to position the knife between an open position and a closed position; and a lock mounted to the handle, wherein said lock is configured to slide in a slotted hole in the handle to transition between an operable position and an inoperable position, where in the operable position said lock is configured to obstruct a path of the distal end of the blade to prevent the knife from being placed in the open position.]

[2. The knife of claim 1, wherein said lock is configured to use friction to maintain a position in the slotted hole.]

[3. The knife of claim 2, wherein the friction on the lock is adjustable.]

[4. A folding knife comprising:

a blade including a distal end and a tang;

a handle configured to include a hollow region for receiving the blade, said blade being pivotally coupled to the handle via a pin to position the knife between an open position and a closed position;

a lock mounted to the handle, said lock configured to obstruct a path of the distal end of the blade to prevent the knife from being placed in the open position; and a bias element configured to assist a user in opening the knife.]

[5. The knife of claim 4, wherein the bias element is configured to exert a force in opening the knife.]

[6. The knife of claim 1, wherein the tang is configured to protrude from the handle when the knife is in the closed position.]

[7. A folding knife comprising:

a blade including a distal end and a tang;

a handle including a hollow region configured to receive the blade, said blade being pivotally coupled to the handle via a pin;

a bias element housed in the handle and configured to assist the blade in extending from the hollow region of the handle; and a user-manipulable safety lock configured to prevent the blade from moving out of the hollow region of the handle.]

[8. A folding knife comprising:

a blade including a distal end and a tang;

a handle including a hollow region configured to receive the blade, said blade being pivotally coupled to the handle via a pin;

a bias element housed in the handle and configured to assist the blade in extending from the hollow region of the handle; and a safety lock configured to prevent the blade from moving out of the hollow region of the handle wherein the safety lock includes a block that limits the movement of the distal end of the blade.]

[9. A folding knife comprising:

a blade including a distal end and a tang;

a handle including a hollow region configured to receive the blade, said blade being pivotally coupled to the handle via a pin;

a bias element housed in the handle and configured to assist the blade in extending from the hollow region of the handle; and a safety lock configured to prevent the blade from moving out of the hollow region of the handle wherein the safety lock is configured to slide in a channel in the handle.]

[10. A folding knife comprising:

a blade including a distal end and a tang;

a handle including a hollow region configured to receive the blade, said blade being pivotally coupled to the handle via a pin;

a bias element housed in the handle and configured to assist the blade in extending from the hollow region of the handle; and a safety lock configured to prevent the blade from moving out of the hollow region of the handle wherein the safety lock is configured to slide to a position that allows the blade to move out of the hollow region of the handle.]

[11. A safety lock for locking a blade of a folding knife in a folded position, comprising a block configured to contact the distal end of the blade to prevent the blade from moving out of the folded position wherein the block slides along a slotted hole to move between an operable position and an inoperable position.]

[12. The safety lock of claim 11, wherein the block uses friction to maintain a position in the slotted hole.]

[13. A folding knife comprising:

a blade including a distal end and a tang;

a handle including a hollow region configured to receive the blade, the blade being pivotally coupled to the handle and moveable between an open position and a closed position; and a safety lock including a slidable block that slides substantially lengthwise relative to the handle and is adapted to obstruct the movement of the distal end of the blade when the blade is in the closed position.]

*14. A folding knife comprising:*

*a blade having a tang end and a distal end; and*

*a handle having first and second sides defining between them a hollow region, the blade being coupled at the tang end to the handle and rotatable around a first axis between an open position, in which the blade extends away from the handle, and a closed position in which the blade is received in the hollow region of the handle, the first side of the handle having an elongated slot;*

*a safety lock slidably coupled to the first side of the handle and configured to slide along the elongated slot between a locked position, in which, while the blade is in the closed position, the safety lock extends between the distal end of the blade and an opening of the hollow region, and an unlocked position, in which the safety lock does not interfere with movement of the blade, the safety lock including:*

*a threaded fastener; and*

*a block having an aperture and a blocking portion, the threaded fastener extending through the elongated slot and engaging the aperture, the blocking portion extending from the first side of the handle into the hollow region toward the second side of the handle without contacting the second side of the handle.*

*15. The folding knife of claim 14 wherein the block of the safety lock is of a non-metallic material to prevent damage to a sharpened edge of the blade in the event of contact between the sharpened edge and the block.*

* * * * *